(12) United States Patent
Holt (10) Patent No.: US 8,368,554 B2
(45) Date of Patent: Feb. 5, 2013

(54) SYSTEM AND METHOD FOR COLLECTING INFORMATION FROM UTILITY METERS

(75) Inventor: John R. Holt, Wake Forest, NC (US)

(73) Assignee: Elster Electricity LLC, Raleigh, NC (US)

( * ) Notice: Subject to any disclaimer, the term of this patent is extended or adjusted under 35 U.S.C. 154(b) by 1446 days.

(21) Appl. No.: 12/002,644

(22) Filed: Dec. 18, 2007

(65) Prior Publication Data

US 2009/0153356 A1   Jun. 18, 2009

(51) Int. Cl.
*G08B 23/00* (2006.01)
(52) U.S. Cl. .................. 340/870.02; 700/295; 710/305; 370/310
(58) Field of Classification Search .............. 340/870.02; 700/295; 710/305; 370/310
See application file for complete search history.

(56) References Cited

U.S. PATENT DOCUMENTS

| 7,116,243 | B2* | 10/2006 | Schleich et al. | 340/870.02 |
| 7,289,887 | B2* | 10/2007 | Rodgers | 700/295 |
| 7,451,019 | B2* | 11/2008 | Rodgers | 700/295 |
| 7,522,639 | B1* | 4/2009 | Katz | 370/503 |
| 7,765,035 | B2* | 7/2010 | Rodgers | 700/295 |
| 8,171,364 | B2* | 5/2012 | Veillette | 714/748 |
| 2005/0038326 | A1* | 2/2005 | Mathur | 600/300 |
| 2005/0053047 | A1* | 3/2005 | Osterloh et al. | 370/344 |
| 2005/0132115 | A1* | 6/2005 | Leach | 710/305 |
| 2005/0179561 | A1* | 8/2005 | Osterloh et al. | 340/870.02 |
| 2005/0184881 | A1* | 8/2005 | Dusenberry et al. | 340/870.02 |
| 2005/0184882 | A1* | 8/2005 | Angelis et al. | 340/870.02 |
| 2006/0071812 | A1* | 4/2006 | Mason et al. | 340/870.02 |
| 2006/0071813 | A1* | 4/2006 | Kagan | 340/870.02 |
| 2006/0184288 | A1* | 8/2006 | Rodgers | 700/295 |
| 2007/0001868 | A1* | 1/2007 | Boaz | 340/870.02 |
| 2009/0146838 | A1* | 6/2009 | Katz | 340/870.02 |

FOREIGN PATENT DOCUMENTS

WO   WO 2006096854 A2 *  9/2006

\* cited by examiner

*Primary Examiner* — Jared Fureman
*Assistant Examiner* — Alfonso Perez Borroto
(74) *Attorney, Agent, or Firm* — Woodcock Washburn LLP (57) ABSTRACT

A method of communicating between a collector meter and back haul device is disclosed. The method provides the collector meter, the collector meter has a local communications means for communicating to a plurality of utility metering devices, the collector meter also has having a short haul communications means. The method further provides the back haul device. The back haul device having the short haul communication means and a wireless telephonic communication means. The method communicates information between the collector meter and the back haul device using the short haul communication means. The method further sends data from the back haul device to a utility receiving center using the wireless telephonic means.

16 Claims, 5 Drawing Sheets

Figure 1
(Prior Art Collector)

SYSTEM AND METHOD FOR COLLECTING INFORMATION FROM UTILITY METERS

BACKGROUND

1. Field of Invention

The present invention relates generally to utility metering systems, and more particularly to a method and system for communicating between multiple utility metering devices and the utility company.

2. Relevant Background

Utility companies use utility meters to regulate and monitor utility usage. Some exemplary utility meters may include electrical power meters, water flow meters, gas meters and the like. Early utility meters were electromechanical in nature converting the flow of electricity, water or gas through the utility meter into mechanical movement. The mechanical movement was used to turn a recording device which recorded the amount of services being used. As technology improved over the years, the design of the utility meter incorporated new innovations such as increased processing capability within the utility meter, elimination of mechanical parts, better accuracy and the like.

Previously, gathering information from the utility metering devices involved having a utility craftsperson physically go to the utility meter periodically and read the meter. The utility craftsperson would then enter the amount of service the consumer was using and proceed on to the next meter. In a densely packed neighborhood, the utility craftsperson could inspect many utility meters in short period of time while avoiding unfriendly pets, unhappy consumers and the occasional drenching rain. As the utility meter reader moved on to more rural expanses, the amount of time needed to read the utility meter and record the amount of services used by the consumer increased dramatically.

As the utility meters have evolved, the ability to gather information from the utility meters has also evolved. For example, newer utility meters currently have the ability to communicate through wireless means with each other. Communicating wirelessly between utility meters may allow the utility meter to gather information about itself as well as other utility meters. One particular utility metering device that gathers information for the utility company is a collector meter.

A collector meter may be a specialized utility meter that gathers information from other utility devices using a LAN and then sends the gathered information to the utility company over a WAN. Commonly, collector meters communicate with other utility meters in its LAN over unlicensed frequency spectrums. Once information has been gathered by the collector meter, the collector meter transmits this information via WAN to the utility company. In some instances, the transmission of information may take place over a telephone line. In this example, the utility company may have a dedicated land based telephone line for communicating. However, having a dedicated telephone line my not be efficient from a cost or access point of view.

Newer collector meters have taken advantage of the increased coverage of the cellular networks. Instead of using a land based telephone line, newer collector meters utilize cellular telephones to transmit information to and from the utility company. However, some collector meters may utilize unlicensed frequencies that may be close to the cellular telephone frequencies. When this occurs, the collector meters may experience unwanted interference from unlicensed LAN communications to the WAN communications between the collector meter and the utility company, or conversely, from the WAN communications to the LAN communications.

SUMMARY

Accordingly, there exists a need in the industry to have a collector meter that operates in a frequency range far enough away from the current cellular network frequencies. Operating away from the cellular networks allows the collector meter to communicate with other utility meters without having any interference from the cellular network. Information sent from the collector meter may then be retransmitted to the utility company via established cellular networks.

A method of communicating between a collector meter and cellular interface is disclosed. The method provides the collector meter, the collector meter having a first communications means for communicating to a plurality of utility metering devices, the collector meter having a second communications means. The method further provides the cellular interface, the cellular interface having the second communication means and a wireless telephonic communication means. The method collects utility usage data from the plurality of utility meters by the collector meter utilizing the first communication means and communicates the utility usage data from the collector meter to the cellular interface using the second communication means. The method sends the utility usage data from the cellular interface to a utility receiving center using the wireless telephonic means.

A collector metering device is disclosed. The collector metering device has metering circuitry, the metering circuitry measuring an amount of resources used by a consumer. The collector metering device has a local area network (LAN) communication circuit, wherein the collector meter communicates with other metering devices using the LAN communication circuit. The collector metering device further has an interface circuit and a short haul communication circuit, the interface circuit providing communication between the LAN communication circuit and the short haul communication circuit. The collector metering device communicates with a cellular interface using the short haul communication circuit.

A cellular interface for communicating with a utility company, the cellular interface is disclosed. The cellular interface has a cellular radio frequency (RF) circuit electrically coupled to an interface circuit, the interface circuit is electrically coupled to a short haul RF circuit wherein the short haul RF circuit communicates with a collector meter, the collector meter transmits customer usage information via the short haul RF circuit and the interface circuit passing the information on to the cellular RF circuit which communicates the customer usage information with the utility company using cell phone technology.

A more complete understanding of the present invention, as well as further features and advantages of the invention, will be apparent from the following detailed description and the accompanying drawings.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Figure 1:
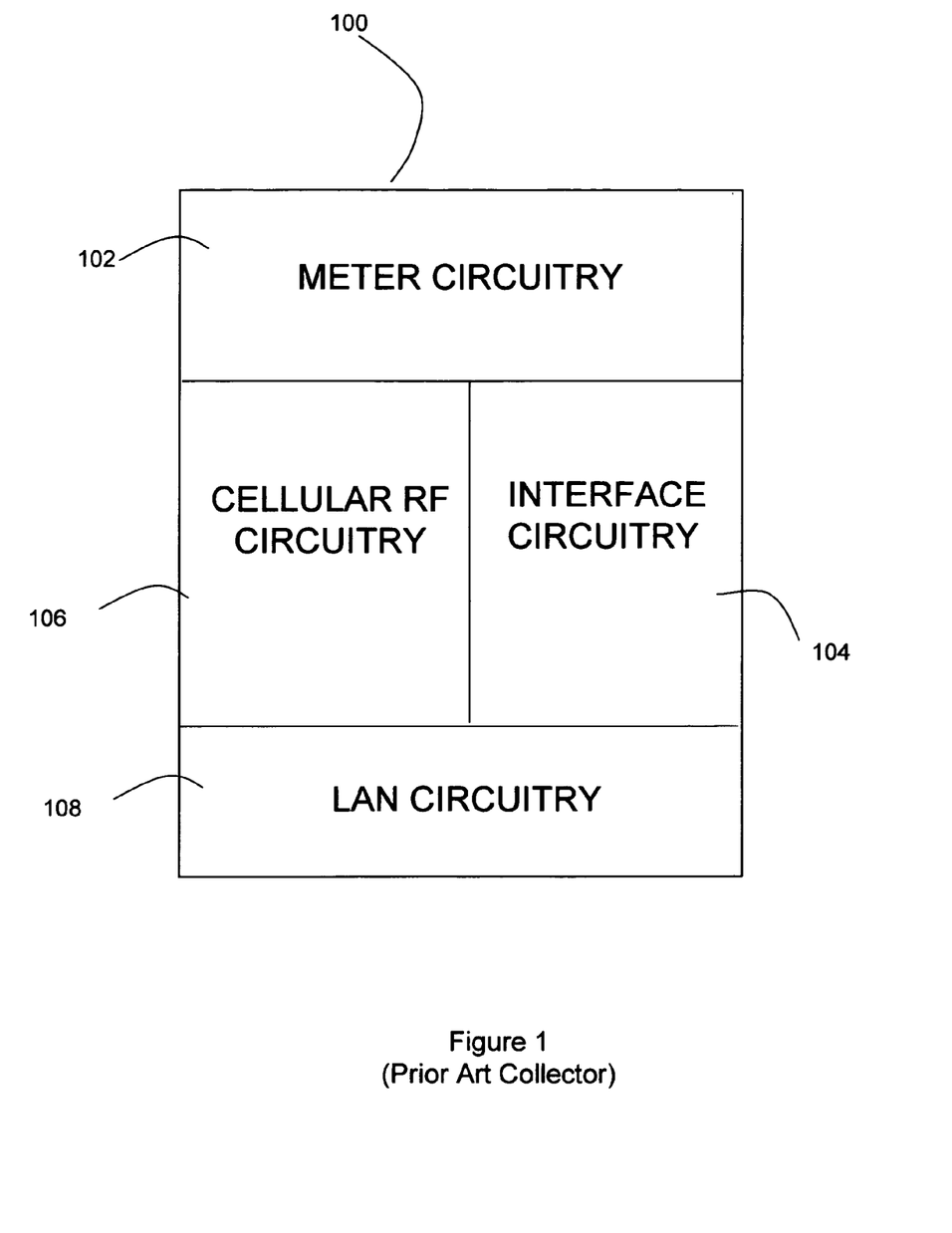
FIG. 1 shows a prior art collector meter.

FIG. 1 shows a functional block diagram of a prior art collector meter 100. Within the collector meter 100 is meter circuitry 102, cellular radio frequency (RF) circuitry 106, interface circuitry 104, and local access network (LAN) circuitry 108. Each of the four circuits, the meter circuitry 102, the cellular RF circuitry 106, the interface circuit 104, and the LAN circuit 108 are located within the same collector meter 100 and communicate with each other using a shared or common bus and control signals. The collector meter 100 is typically attached to the outside of a utility customer's home.

The meter circuitry 102 gathers information relating to the amount of service that a particular utility customer uses at the meter's physical location. In some applications, the type of service that the collector meter 100 monitors is electrical power. In other applications the collector meter 100 may gather information relating to natural gas usage. Alternatively, the collector meter 100 may gather information relating to the amount of water the utility customer uses. For each of these different applications, the collector meter may have meter circuitry 102 specific to each application monitoring the various utility services. Since the metering functions may be completely different, the meter circuit 102 for monitoring electrical usage may be completely different than meter circuitry 102 for monitoring water usage.

In addition to the amount of services the utility customer uses, the collector meter 100 gathers information from other utility meters which may be located nearby. The LAN circuitry 108 within the collector meter 100 may communicate with other utility meters located within the utility meter network. In one exemplary embodiment, the LAN circuitry 108 may have functionality allowing the collector meter 100 to communicate with the other utility meters using wireless communications. As part of the communication with the other utility meters, customer usage data or information may be sent to the collector meter 100. The LAN circuitry 108 receives the customer usage data from the other utility meters in the utility network. The interface circuitry 104 is coupled to the LAN circuitry 108 and takes the customer usage data and sends it to the cellular RF circuit 106 for retransmission to the utility company.

Commonly in some collector meters, the LAN circuitry 108 may transmit and receive data from other utility meters in the industrial, scientific and medical (ISM) radio bands. ISM radio bands may be the preferred radio frequencies used by the collector meter 100 for communicating with the other utility meters due to the fact that operating in these frequency bands typically does not require a license. The ISM bands were originally reserved internationally for the use of RF electromagnetic fields for industrial, scientific and medical equipment. However over time, these radio frequencies have been used for LAN communications. One of the common ISM bands that may be used by the LAN circuitry 108 for communication may be between 902 MHz and 928 MHz, with a center frequency of 915 MHz.

The cellular RF circuitry 106 receives the customer usage data from the LAN board 106 via the interface circuitry 104 and formats it for retransmission by the cellular radio circuitry. The cellular RF circuitry 106 transmits the customer utility usage data via a cellular radio frequency to the utility company. The utility company may also transmit commands or other instructions to the collector meter 100 through the cellular radio circuitry for distribution to the other utility meters within collector meter's LAN network. Some exemplary cellular radio frequencies that the cellular radio circuitry may use to transmit and receive information to and from the utility company may be in the range of 824.04 MHz to 848.97 MHz (transmit) and 869.04 MHz to 893.97 MHz (receive). The particular center frequency for the transmit and receive bands may not be predetermined and as a result, the cellular RF circuitry 106 may have to utilize any frequency in either band.

One difficulty experienced by the prior art collector meter 100 is noise interference that may exist between the LAN circuitry 106 and the cellular RF circuitry 108. Due to the close proximity of the frequency bands, noise may be generated by the cellular RF transmissions sent to the collector meter 100. The noise may cause interference problems for the LAN circuitry 108 when the LAN circuitry 108 communicates with the other utility meters in the LAN network.

The collector meter 100 may be designed with a filter in order to remove the noise bleeding into the ISM frequency spectrum from the cellular transmissions and to remove noise bleeding into the cellular frequency spectrum from the ISM communications. However, incorporating this type of filter into the collector meter 100 may prove difficult due to the amount of power, space and effectiveness required. Alternatively, within the collector meter 100, the antenna for the LAN communications may be positioned as far away from the antenna for the cellular RF communications. But due to the size of the collector meter 100, there may not be enough separation between the two antennas to make much difference.

Figure 2:
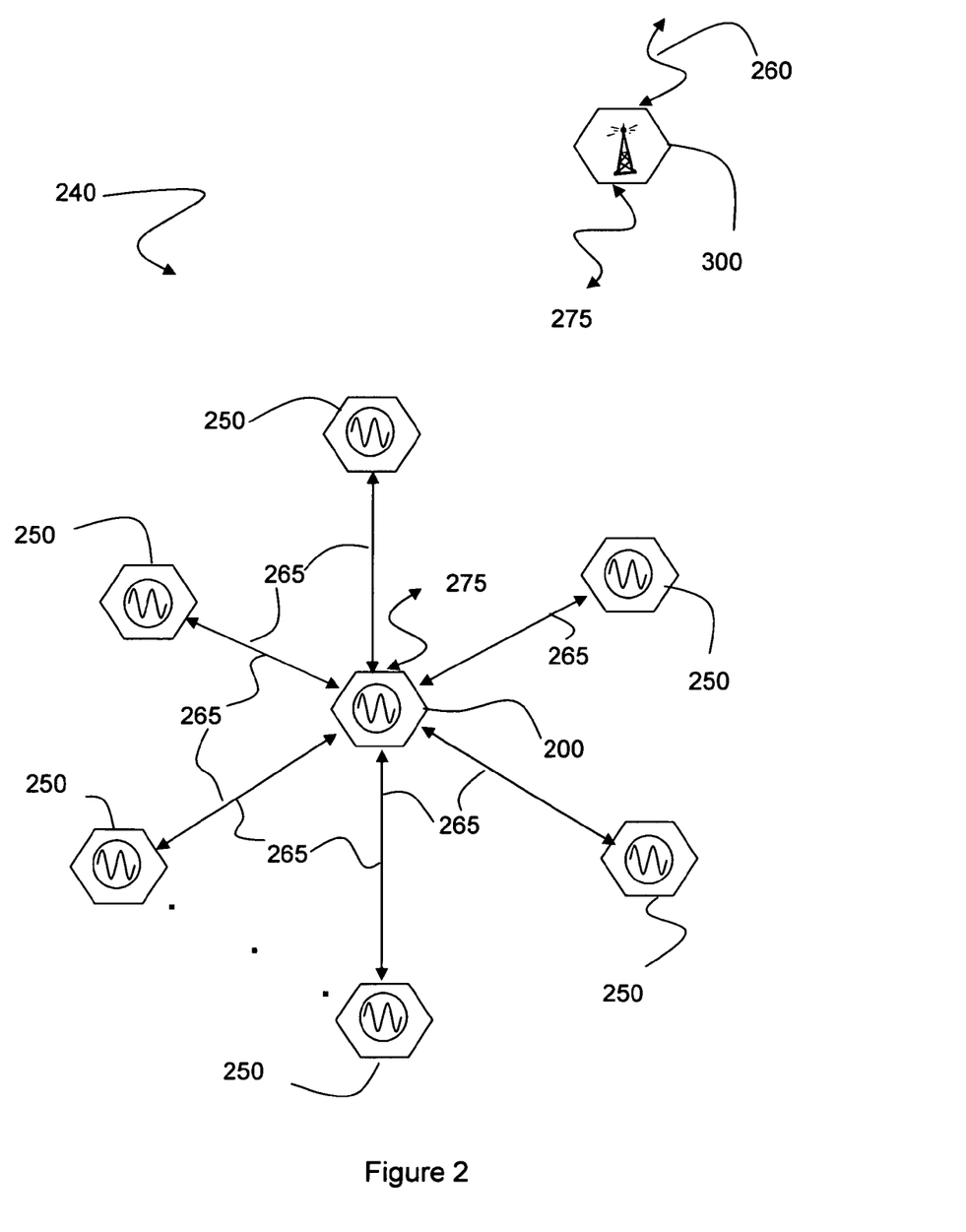
FIG. 2 displays a collector meter in accordance with one embodiment of the present invention deployed in a utility meter network.

FIG. 2 displays a collector meter 200 in accordance with one embodiment of the present invention deployed in a customer utility network 240. As is described in greater detail in the discussions of FIG. 3, the collector meter 200 communicates via a first wireless communications means 265 with other utility meters 250 in the utility network 240. The utility network 240 may consist of several utility meters 250 which may be mounted to the side of the utility customer's home and are monitoring the customer's utility usage. The utility meters 250 store the customer's utility usage and provide this information to the collector meter 200 when polled. The customer utility usage information gathered by the collector meter 200 is transmitted via a second wireless communication means 275 to a cellular interface 300 for retransmission to the utility company.

Some exemplary customer utility usage information may include peak usage, average daily usage, actual monthly usage, usage trends and the like. The utility meters 250 may send the information to the collector meter 200 on a periodic schedule or the information may be requested by the collector meter 200. The utility meters 250 may monitor electrical power, natural gas, or water usage. The inventive concepts of the various embodiments of the present invention may by applied to any utility service which may be monitored by the utility company.

Figure 3:
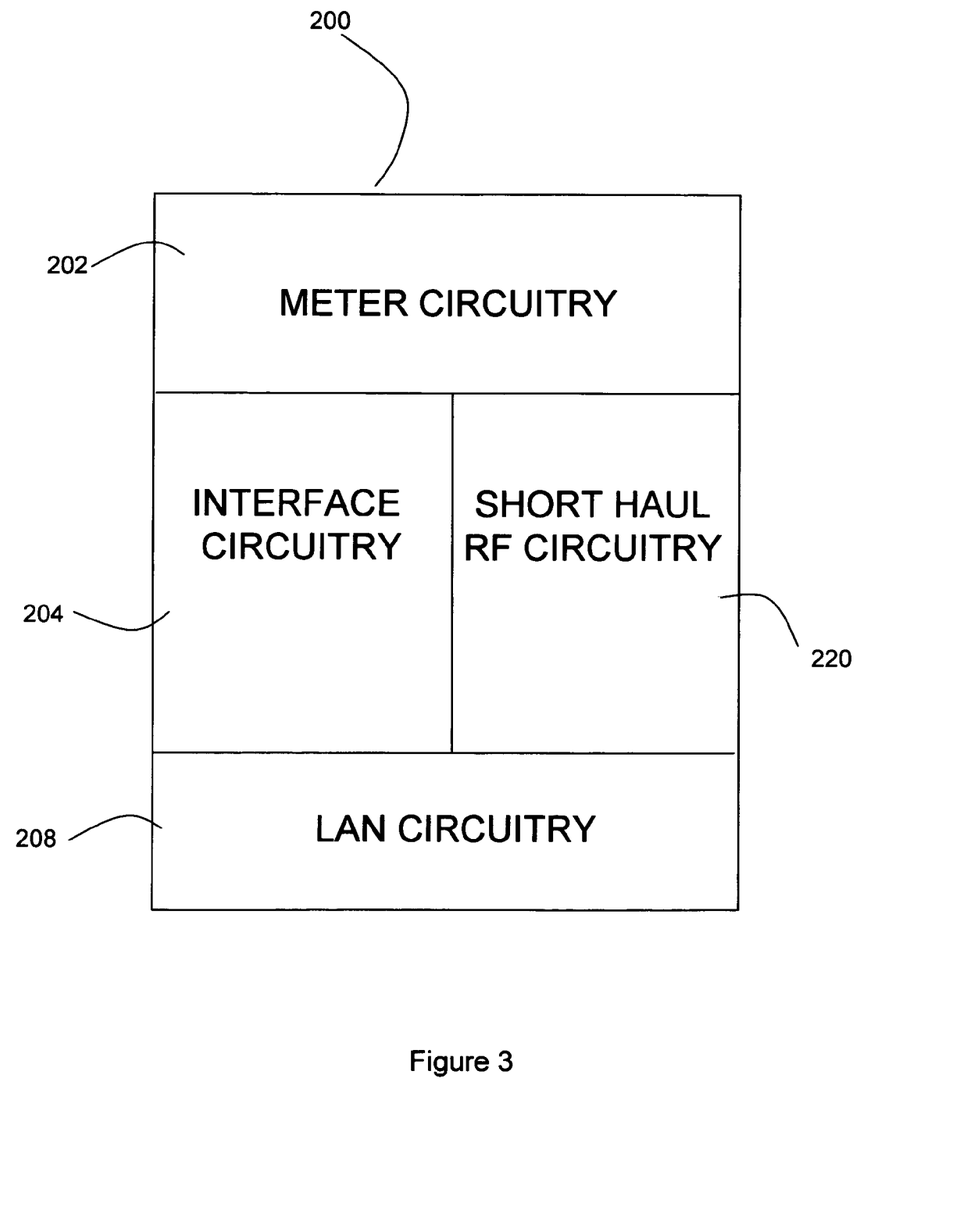
FIG. 3 displays a collector meter in accordance with one embodiment of the present invention.

FIG. 3 displays a detailed functional block diagram of the collector meter 200 in accordance with one embodiment of the present invention. The collector meter 200 comprises meter circuitry 202, interface circuitry 204, short haul RF circuitry 220 and LAN circuitry 208. The meter circuitry 202 monitors the utility usage for the utility customer where the collector meter 200 is installed. The collector meter 200 functions as a utility monitoring device in addition to collecting and distributing the utility usage information associated with the other utility meters 250 in the utility network 240.

Within the collector meter 200, the interface circuitry 204 interfaces between the short haul RF circuitry, the meter circuitry 202 and the LAN circuitry 208. The interface circuitry 204 may consist of a microprocessor, memory, discrete logic or any combination thereof. The interface circuitry 208 may share a common bus between the meter circuitry 202, the short haul RF circuitry 220 and the LAN circuitry 208. During operation, the microprocessor within the interface circuitry 204 may control the flow of data between any of the three components (meter circuitry 202, the short haul RF circuitry 220 and the LAN circuitry 208).

The LAN circuitry 208 communicates with the other utility meters 250 located within the utility network 240 serviced by the collector meter 200. The LAN circuitry 208 gathers information relating to each of the utility meters In one exemplary embodiment, the LAN circuitry 208 communicates with the other utility meters within the LAN network, transmitting and receiving information within the 902 Mhz–928 MHz ISM frequency band. Alternatively, the LAN circuitry 208 may transmit and receive information using any other band within the ISM spectrum such as 433.05–434.79 MHz, 40.66–40.70 MHz, or the like. The LAN circuitry 208 within the collector meter 200 may act as a master and the other utility meters 250 within the utility network 240 may act as slaves. The LAN circuitry 208 may poll the utility meters 250 on a periodic basis or when instructed to by the utility company.

The short haul RF circuitry 220 relays information from the collector meter 200 to the RF interface 300. Information is gathered by the short haul RF circuitry 220 from the LAN circuitry 208 relating to customer usage of the utility meters 250 in the utility network 240 as well as the utility usage of the collector meter 200 as determined by the meter circuitry 202. This information is relayed via the interface circuitry 204. In one embodiment, the short haul RF circuitry 220 may utilize frequencies within the ISM spectrum for communicating with the cellular interface 300. In this embodiment, the frequencies used by the short haul circuitry 220 would be different than the ISM frequencies used by the LAN circuitry 208. In one exemplary embodiment, the LAN circuitry may use the frequencies within the 902 Mhz–928 MHz ISM frequency band while the short haul RF circuitry may use frequencies within the 2.400–2.500 GHz ISM frequency band. The collector meter 200 using these frequencies may not experience the noise issues seen in the prior art collector meter 100.

In one exemplary embodiment the short haul RF circuitry 220 may use Bluetooth technology to interface with the cellular interface 300. As those skilled in the art appreciate, Bluetooth is a radio standard and communications protocol designed for low power consumption. Currently many personal cell phones and hand held personal digital assistants (PDA's) utilize Bluetooth head sets or other Bluetooth components. If Bluetooth technology is used for the short haul RF communications between the cellular interface 300 and the collector meter 200, the cellular interface 300 may be the master and the collector meter(s) 200 would be the slave(s).

Typically a Bluetooth device can communicate with up to seven devices. A network group of up to eight devices may also be referred to in the industry as a piconet. As is explained in greater detail in the discussions of the utility network 245 of FIG. 5, the cellular interface 300 may communicate with multiple collector meters 200 which may be deployed within the utility network 240.

Alternatively, the short haul RF circuitry may employ other types of data transport. In another exemplary embodiment, the short haul RF circuitry 220 may transmit and receive data based on ZigBee technology. ZigBee is a data transport technology using small low power digital radios based on the IEEE 802.15.4 standard for wireless personal area networks (WPAN). In the industry, ZigBee devices have been targeted at RF applications that require a low data rate, long battery life and secure communications. Zigbee compliant devices may be configured to communicate in the various ISM radio bands. For example, ZigBee devices may utilize the 915 MHz centered frequency band. Alternatively these devices may utilize the 2.4 GHz frequency band.

As those of sufficient skill in the art appreciate, there are three types of devices that may be deployed when ZigBee technology is utilized. The first device is a ZigBee coordinator. There is typically one ZigBee coordinator deployed in the WPAN with the ZigBee coordinator forming the root of the network tree. The ZigBee coordinator may store information including acting as a repository storing security keys for other ZigBee devices. The second device that may be deployed within a WPAN using ZigBee technology is a ZigBee router. The ZigBee router may be able to run an application as well act like a traditional router and pass data from other devices. The last ZigBee device is a ZigBee end device (ZED). The ZED contains just enough functionality to talk to its parent node (either the ZigBee router or the ZigBee controller). The ZED typically can relay information to its parent but not relay data from other ZEDs.

In another exemplary embodiment, a ZigBee based WPAN may be implemented between the cellular interface 300, the collector meter 200 and the utility meters 250 within the utility network 240. In this implementation, the utility meters 250 may contain ZED type circuitry to communicate with the collector meter 200 having a ZigBee router implemented in the LAN circuitry 208. In turn, the ZigBee router implemented in the LAN circuitry 208 may communicate with a short haul RF circuitry 320 in the cellular interface 300 (FIG. 4) which may function as a ZigBee coordinator.

Figure 4:
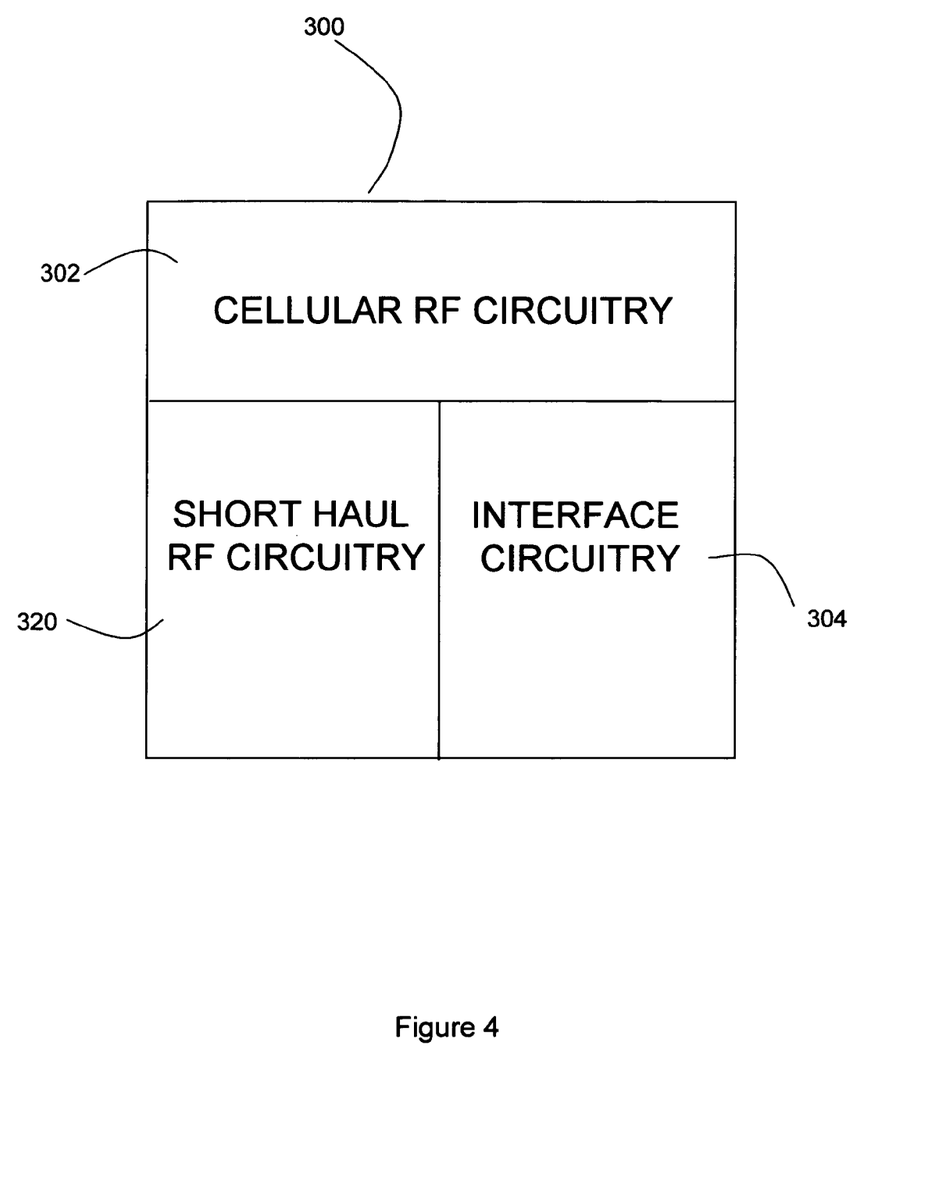
FIG. 4 displays a cellular interface in accordance with one embodiment of the present invention.

The cellular interface 300 in FIG. 4 consists of cellular RF circuitry 302, short haul RF circuitry 320 and interface circuitry 304. Analogous to the interface circuitry 204 in the collector meter 200, the interface circuitry 304 in the cellular interface 300 provides the communication between the cellular RF circuitry 320 and the short haul RF circuitry 320. In one embodiment, the interface circuitry 304 may use a microprocessor, memory, discrete logic circuitry or the like to allow information and data received from the short haul RF circuitry 320 to be relayed and reformatted (if necessary) to be retransmitted out by the cellular RF circuitry 302. Similarly, information received by the cellular RF circuitry for retransmission to the collector meter through the short haul RF circuitry 320 is processed through the interface circuitry 304.

The cellular RF circuitry 302 communicates with the utility company, sending and receiving data via the cellular phone network. As mentioned previously, the cellular RF circuitry 302 may contain circuitry which utilizes frequencies in the range of 824.04 MHz to 848.97 MHz to transmit information to the utility company and 869.04 MHz to 893.97 MHz to receive information from the utility company.

The data collected and transmitted by the collector meter 200 is received by the cellular interface 300 through the short haul RF circuitry 320. More specifically, the short haul RF circuitry 320 communicates with the short haul RF circuitry 220 in the collector meter 200. Once communication has been established between the cellular interface 300 and the collector meter 200, information and data are packetized and transmitted by the short haul RF circuitry 220. Correspondingly, the data is received by the short haul RF circuitry 320 and retransmitted to the utility company via the cellular RF circuitry 302.

The collector meter 200 utilizing the inventive concepts as presented herein may bypass the noise issue presented in the prior art collector meter 100. The short haul RF circuitry 220 communicates with the cellular interface 300 on a frequency band away from the cellular radio frequency band. This separation of frequency bands keeps noise from the cellular frequency band bleeding into the LAN communications and it keeps noise from the LAN communications from bleeding into the cellular frequency band.

Figure 5:
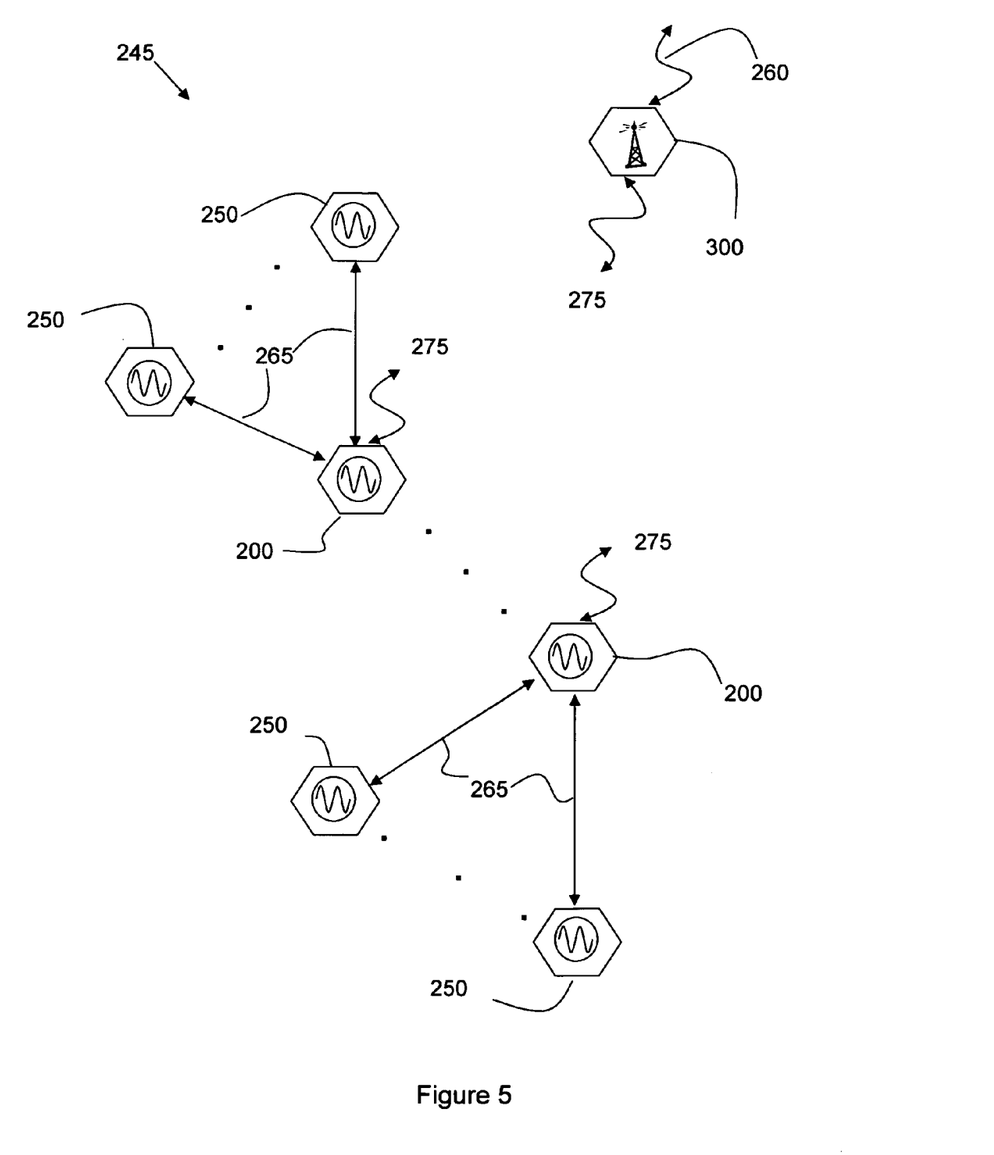
FIG. 5 displays an alternate embodiment of a cellular interface communicating with a plurality of collector meters.

FIG. 5 displays a utility network 245 in accordance with an alternate embodiment. Within the utility network, the cellular interface 300 communicates with multiple collector meters 200. As mentioned previously, if Bluetooth technology is used, the master device may communicate with up to seven other active Bluetooth enabled devices in a piconet at the same time. In addition, there may be other Bluetooth enabled devices on the same piconet that may be inactive that may be turned on as other devices are turned off. Depending on density of utility meter network 245 and the communication range of the Bluetooth device, one cellular interface 300 may be able to communicate with hundreds of collector meters 200.

One advantage of distributing the cellular RF function from the prior art collector meter 100 to the cellular interface 300 is that it provides the utility company flexibility in determining where to place the collector meter 200 and the cellular interface 300 for optimum performance. For example, the utility company may have experienced a problem with cellular coverage in a particular neighborhood using the prior art collector meter 100. In the neighborhood in question there may be no cellular coverage. Using an embodiment of the present invention, the utility company may move the cellular interface 300 to the top of a utility pole a mile away from the neighborhood. Moving the cellular interface 300 to this location may allow better cellular radio reception thus improving the cellular communication with the utility company. Additionally, moving the cellular RF communications from the collector meter 100 to the cellular interface 300 alleviates the noise interference issue that existed with the prior art.

As those skilled in the art appreciate, Bluetooth technology and ZigBee technology are meant as illustrative examples of various formats that may be employed by embodiments of the present invention. Other types of transport technology currently available in the industry such as WIMAX, or WiFi may be employed by other embodiments using the inventive concepts as presented and outlined herein.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method comprising:
communicating, by a local area network (LAN) communication circuit in a collector meter, with a plurality of utility metering devices using a first frequency band, the collector meter having a short haul communication circuit;
collecting utility usage data from the plurality of utility meters by the collector meter utilizing the LAN communication circuit;
communicating, via the short haul communication circuit, the utility usage data from the collector meter to a cellular interface using a second frequency band that is different than the first frequency band, the cellular interface being physically separate from the collector meter, thereby reducing noise between the LAN communication circuit and the cellular interface.

2. The method of claim 1 wherein the collector meter is a power meter.

3. The method of claim 1 wherein the collector meter is a water meter.

4. The method of claim 1 wherein the collector meter is a gas meter.

5. The method of claim 1 wherein the short haul communication circuit utilizes Bluetooth technology.

6. The method of claim 1 wherein the short haul communication circuit utilizes ZigBee based technology.

7. The method of claim 1 wherein the LAN communication circuit utilizes ZigBee based technology.

8. A collector metering device comprising:
metering circuitry, the metering circuitry configured to measure an amount of resources used by a consumer,
a local area network (LAN) communication circuit configured to communicate with other metering devices using a first frequency band;
an interface circuit configured to process communication between the LAN communication circuit and a short haul communication circuit; and
the short haul communication circuit configured to communicate with a cellular interface using a second frequency band that is different than the first frequency band, wherein the cellular interface is physically separate from the collector metering device, thereby reducing noise interference between the LAN communication circuit and the cellular interface.

9. The collector metering device of claim 8 wherein the the first frequency band comprises frequencies in the instrument, scientific and medical (ISM) bands.

10. The collector metering device of claim 8 wherein the second frequency band comprises frequencies in the instrument, scientific and medical (ISM) bands.

11. The collector metering device of claim 10 wherein the short haul communication circuit uses Bluetooth technology to communicate with the cellular interface.

12. The collector metering device of claim 10 wherein the short haul communication circuit uses ZigBee technology to communicate with the cellular interface.

13. The collector metering device of claim 8 wherein customer utility usage information is communicated to the cellular interface.

14. The collector metering device of claim 13 wherein the collector metering device monitors consumer electrical usage.

15. The collector metering device of claim 13 wherein the collector metering device monitors consumer gas usage.

16. The collector metering device of claim 13 wherein the collector metering device monitors consumer water usage.

* * * * *